United States Patent [19]

Miller

[11] Patent Number: 4,587,587
[45] Date of Patent: May 6, 1986

[54] DUAL TRANSDUCER ASSEMBLY WITH LINEAR ADJUSTMENT

[75] Inventor: John H. Miller, San Jose, Calif.

[73] Assignee: Eastman Kodak Company, Rochester, N.Y.

[21] Appl. No.: 518,783

[22] Filed: Jul. 29, 1983

[51] Int. Cl.$^4$ .............................................. G11B 5/54
[52] U.S. Cl. ..................................... 360/109; 360/105
[58] Field of Search ............. 360/109, 104, 105, 97–99

[56] References Cited
U.S. PATENT DOCUMENTS

| | | | |
|---|---|---|---|
| 3,613,214 | 10/1971 | MacArthur | 360/109 |
| 4,151,573 | 4/1979 | Tandon et al. | 360/104 |
| 4,349,851 | 9/1982 | Higashima et al. | 360/105 |
| 4,400,750 | 8/1983 | Krane | 360/105 |

Primary Examiner—Stuart N. Hecker
Assistant Examiner—Benjamin Urcia
Attorney, Agent, or Firm—Robert F. Cody

[57] ABSTRACT

A linear adjustment mechanism for a double-sided flexible disk head assembly includes a bearing slot formed in the rear surface portion of a lower transducer arm, a slide block carrier by the upper surface of the lower arm member and an upper transducer arm member. The slide block has a vertically arranged bearing aperture for accommodating a crank having an eccentric pin dimensioned to be received in the bearing slot and a shank portion dimensioned to be received in the bearing aperture in the slide block. Rotation of the crank shank provides a translational force via the bearing slot and bearing aperture between the first and second arm members.

5 Claims, 6 Drawing Figures

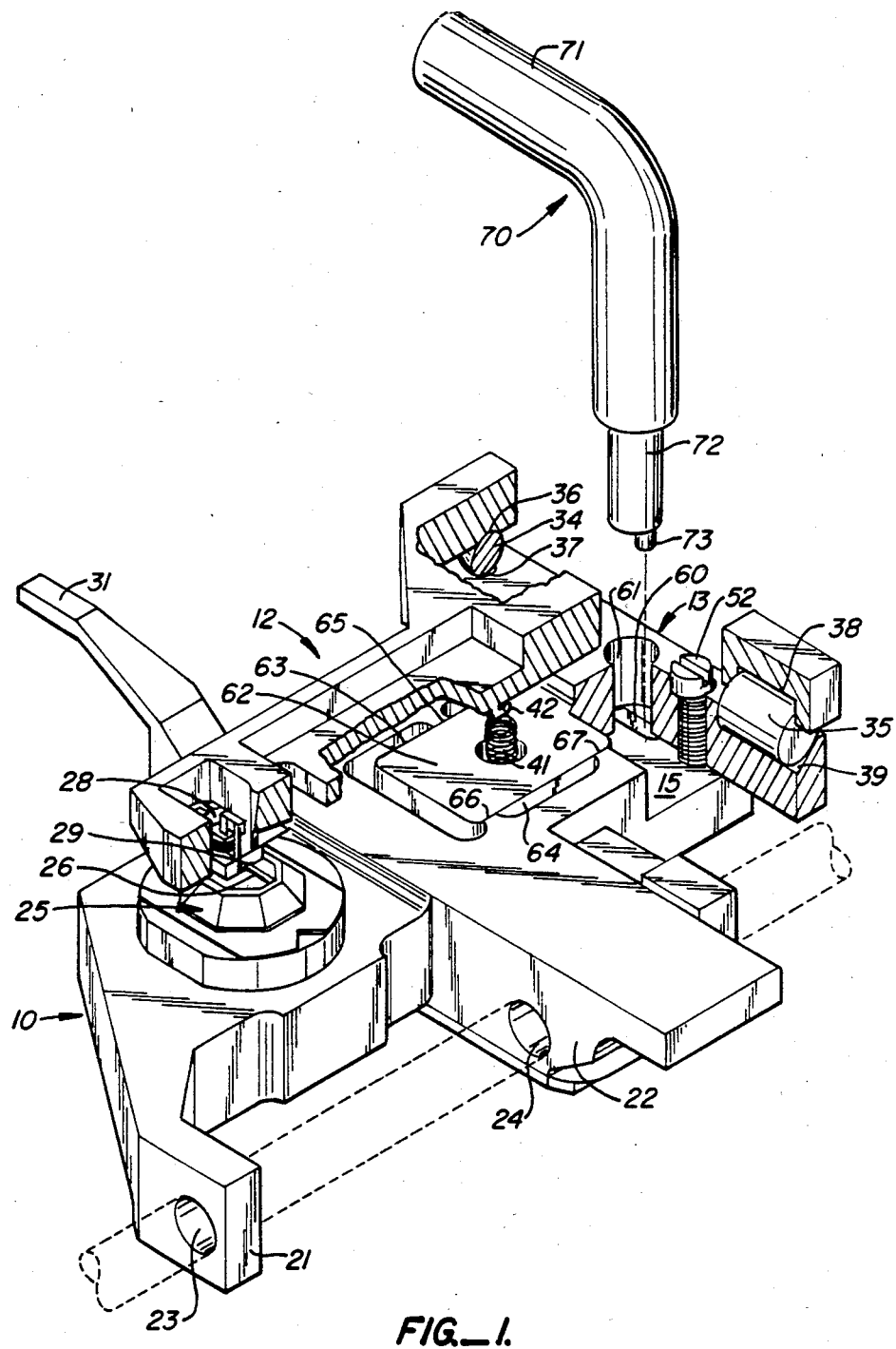
FIG._1.

FIG._4.
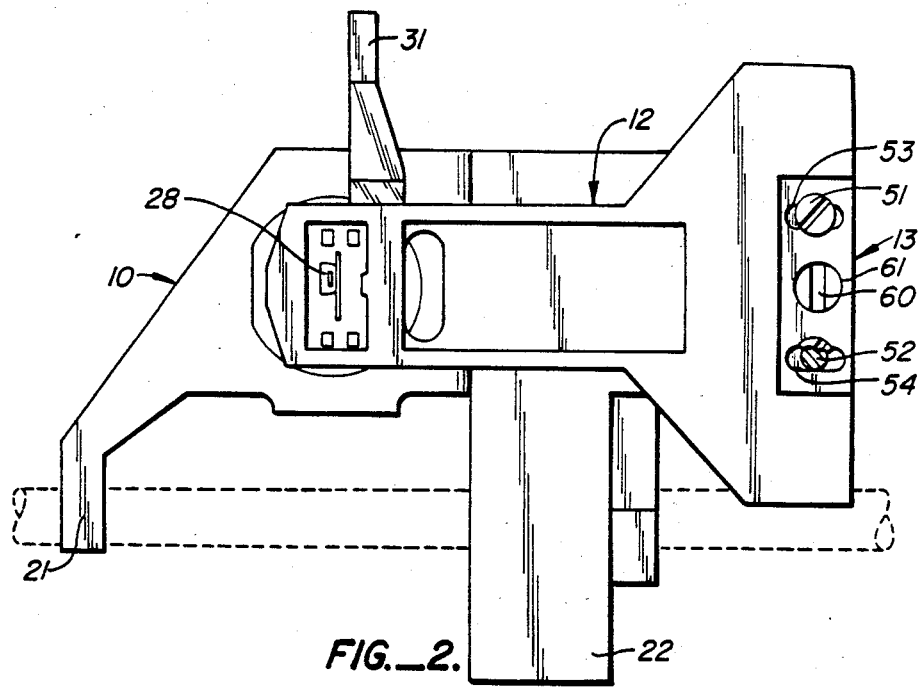
FIG._2.
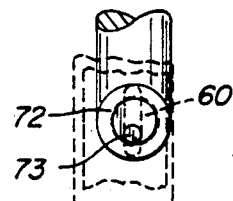
FIG._5A.
FIG._5B.
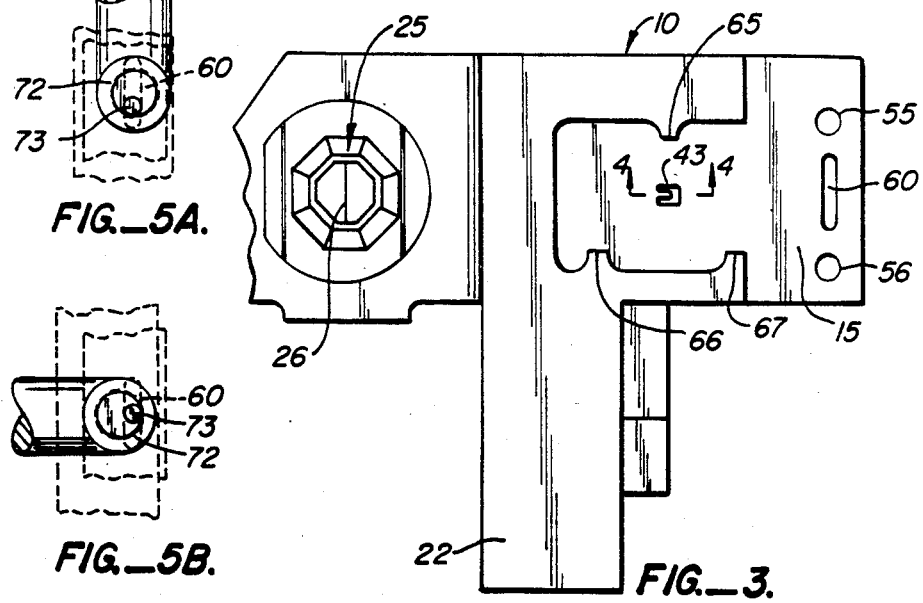
FIG._3.

DUAL TRANSDUCER ASSEMBLY WITH LINEAR ADJUSTMENT

This invention relates to transducer assemblies for disk drives employing dual transducers.

Rotating memory systems are known which employ a linearly translatable carriage assembly, at the end of which a pair of read/write magnetic transducers are located. Such transducers are used to read data to and write data from preselected tracks on dual sided magnetic memory disks, which are designed for rotation by a drive spindle. There are two basic types of rotating memory systems: those employing hard disks and those employing flexible or floppy disks. In each type of system, the transducers must be accurately aligned relative to one another in order to optimize the read/write capability of the system. For hard disk systems, particularly using multiple disk platters, adjustment mechanisms have been devised for enabling linear adjustment of each individual transducer along a radius of the disk-spindle combination. A representative adjustment apparatus of this type is disclosed in U.S. Pat. No. 3,743,794 issued July 3, 1973 for "Translational Motion Apparatus for the Magnetic Transducers of a Disk Memory", the disclosure of which is hereby incorporated by reference. Briefly, the adjustment apparatus comprises a wrench-like tool having a cylindrical shank terminating in an eccentrically offset pin, and a series of slots and associated recesses formed, respectively, in the translatable arm support and the frame portion of the carriage assembly. The individual radial position of each transducer is adjusted by inserting the pin into the slot formed in the rear portion of the associated arm support member and rotating the wrench, translational motion being provided by the motion of the eccentric pin and the motion of the cylindrical shank received in the support recess.

Radial positioning mechanisms have also been devised for adjusting the relative radial positions of two transducers in double sided flexible disk head assemblies. Typically, one of the transducers is mounted on a lower arm which has no adjustment provision, and another transducer is mounted on an upper arm which includes a linear adjustment mechanism for changing the position of the upper arm (and thus the transducer carried by the upper arm) relative to the lower arm. Such mechanisms typically employ a threaded member positioned at the rear of the upper arm and at least one threaded nut with which one portion of the threaded member is engaged, the nut being captured in a recess formed in the upper transducer arm so that rotation of the threaded member using a small wrench causes translation of the upper arm relative to the lower arm. In order to confine the translational movement to a radial linear path, flanking dovetail ways are provided for the sliding contact between the upper and lower arms. While useful, this arrangement has a disadvantage of requiring fabrication and assembly of additional adjustment elements which adds unnecessary cost to an already cost-conscious product (flexible disk drives). In addition, care must be taken when rotating the threaded member with a wrench to avoid undue downward pressure on the pivotally arranged upper arm in order to avoid damaging the arm assembly components and the flexible recording media positioned between transducers when the adjustment is being monitored.

SUMMARY OF THE INVENTION

The invention comprises an improved adjustable dual transducer assembly which provides a linear radial adjustment for the upper transducer arm relative to the lower transducer arm and which requires no separate additional alignment costs, is relatively inexpensive to implement and is extremely simple in construction and operation.

The invention includes first and second arm members each having a transducer mounting end on which a separate transducer is securely mounted, with the transducers facing one another. The upper transducer arm is pivotally mounted at the rear portion thereof to a slide block which is slidably secured to the lower transducer arm. The slide block is releasably locked to the lower arm member by means of a pair of screws passing through elongated apertures in the slide block and threadably received in corresponding apertures formed in the rear portion of the lower arm member. The upper arm is pivotally mounted to the slide block by means of first and second pivot members each located in appropriate recesses formed respectively in the lower and upper surfaces of the upper arm and slide block in the region of the corners. In the preferred embodiment, one of the pivot members is a ball and the other pivot member is a cylinder.

Relative adjustment is provided between the slide block (and thus the upper arm) and the lower arm member by virtue of means on the lower arm member for providing a linear guide path, means on the slide block for contacting the guide path, a bearing slot formed in the lower arm member at the rear portion and a bearing aperture formed in the slide block for exposing the slot to receive an eccentric pin on a crank and for providing a bearing surface for a shank portion of the crank, so that rotation of the shank provides a translational force between the upper and lower arm members.

The linear guide path providing means comprises a pair of protruding inner wall extensions formed in the lower arm member, the inner wall extensions terminating in co-planar guide surfaces, and the means for contacting the guide path comprises a first sidewall member of the slide block. The linear guide path providing means further includes an additional protruding inner wall extension formed in the lower arm member and laterally disposed from the pair of inner wall extensions, the additional inner wall extension terminating in an additional guide surface, and the means on the slide block for contacting the guide path includes the other sidewall member of the slide block.

The upper and lower arm members are mutually tensioned by means of a tension spring coupled between the two arm members by means of attachment lugs formed, respectively, on the lower surface of the upper arm member and within a recess in the upper surface of the lower arm member.

Relative adjustment is simply effected by merely inserting the crank pin into the bearing slot in the rear portion of the lower arm member so that the shank portion is received in the bearing aperture formed in the slide block, and rotating the crank in an appropriate angular direction to translate the upper arm member (and thus the upper transducer) with respect to the lower arm member (and thus the lower transducer).

The invention provides a highly accurate adjustment capability for double-sided flexible disk head assemblies without requiring the addition of any precision adjustment parts. The three major components of the invention: viz. the upper arm, the lower arm and the slide block can be molded or die cast using plastics or metals.

For a further understanding of the nature and advantages of the invention, reference should be had to the ensuing detailed description taken in conjunction with the accompanying drawings.

BRIEF DESCRIPTION OF THE DRAWINGS

FIG. 1 is a partially cutaway perspective view of a preferred embodiment of the invention;

FIG. 2 is a top plan view of the FIG. 1 embodiment;

FIG. 3 is a top plan view of the lower arm with the upper arm removed;

FIG. 4 is a sectional view taken along lines 4—4 of FIG. 3; and

FIGS. 5A and 5B are partial schematic views illustrating two different adjustment positions.

DESCRIPTION OF THE PREFERRED EMBODIMENTS

Turning now to the drawings, FIG. 1 illustrates a preferred embodiment of the invention in partially broken away perspective form. As seen in this Fig., the radially adjustable double transducer mount includes a lower arm designated with reference numeral 10, a pivotable upper arm generally designated with reference numeral 12 and a slide block generally designated with reference number 13 and supported on surface 15 (FIG. 3) of arm 10. Lower arm 10 includes a pair of laterally offset support members 21, 22 having aligned through apertures 23, 24 for slidably receiving a support rod illustrated in broken lines so that the entire arm assembly may be translated along a radius of an associated disk drive (not shown).

Secured to the inner end portion of lower arm 10 is a conventional button transducer 25 of a known construction and having a pole piece 26 containing a first transducer gap or set of gaps (not shown).

The upper transducer arm 12 includes an inner end portion carrying a second transducer 28 having a second pole piece 29 to be aligned relative to the pole piece 26 of the lower transducer 25. Upper arm 12 includes an integrally molded lifting tab 31. Upper arm 12 is pivotally mounted at the outer end to the rear portion of slidable support block 13 by means of a pair of laterally displaced pivot members illustrated as a ball 34 and a cylinder 35. Ball 34 is captured by partially spherical recesses 36, 37 formed, respectively, in the undersurface of one corner rear portion of arm 12 and the upper surface of one corner of spacer block 13. Cylindrical pivot 35 is captured by a pair of cylindrical or wedge shaped recesses 38, 39 formed, respectively, in the under surface of the other corner rear portion of arm 12 and the other corner upper surface portion of spacer block 13. Arm 12 is biased towards arm 10 by means of a light tension spring 41 coupled between a mounting lug 42 formed in the lower central surface portion of upper arm 12 and a mounting lug 43 (see FIGS. 3 and 4) formed in a lower inner wall portion of lower arm 10.

Slide block 13 is releasably secured to the lower arm 10 by means of a pair of screws 51, 52 which pass through elongated apertures 53, 54 formed through the rear portion of slide block 13, screws 51, 52 being threadably engaged with threaded apertures 55, 56 formed in the rear portion of lower arm 10. Extending between the threaded apertures 55, 56 is an adjustment slot 60 accessible from the top by means of a cylindrical bore 61 formed in the rear portion of slide block 13.

The forward portion of slide block 13 comprises a generally rectangular shaped element having lateral reference walls 63, 64 arranged for a close sliding fit with guide surfaces 65–67 formed in the central portion of lower arm 10. The combination of walls 63, 64 and guide surfaces 65–67 provides three reference surfaces for ensuring linear relative motion between the lower arm 10 and the upper arm 12 during position adjustment, the two co-planar guide surfaces 66, 67 forming a linear guide and the remaining guide surface 65 functioning to maintain wall 64 biased against guide surfaces 66, 67. While arm 10 and 12 and slide block 13 may be fabricated using a variety of techniques, the preferred methods of fabrication are metal die casting and plastic molding. Powdered metal sintering technology and ceramic molding technology may also be applicable to fabricate these elements.

The major subcomponents are assembled to one another by arranging slide block 13 on the support surface 15 with the sidewalls 63, 64 of central element 62 in sliding contact with guide surfaces 65–67. Next, mounting screws 51, 52 are passed through eccentric apertures 53, 54 and threaded into openings 55, 56 to an intermediate torque. Upper arm 12 is then installed on slide block 13 by arranging pivot members 34, 35 in their respective receptacles, and tension spring 41 is installed on lugs 42, 43. The assembly is now ready for relative adjustment between transducers 25, 28.

An adjustment crank 70 includes a handle portion 71 and a working end including a cylindrical shank 72 and an offset eccentric pin 73 extending therefrom. The diameter of shank 72 is preferably slightly undersized from the inner diameter of aperture 61 formed in the slide block 13 to provide a relatively close fit.

Shank 72 of adjustment crank 70 is inserted into aperture 71 until eccentric pin 73 is received in slot 60 formed in the lower arm 10. Crank 70 is next rotated in the appropriate clockwise or counterclockwise direction to force upper arm 12 to be translated with respect to lower arm 10. During rotation of the crank 70, eccentric pin 73 rotates and slides in slot 60 and this motion is converted into translational motion by shank 72 rotating in aperture 61 of slide block 13. The relative positioning effected by the mechanism in two different positions of crank 70 is illustrated in FIGS. 5A and 5B. The range of adjustment afforded in the preferred embodiment is 0.020 inch, and the positioning accuracy with molded plastic components is approximately 200 microinches and with die cast components 50 microinches. After the positional adjustment has been completed, slide block 13 is secured by tightening screws 51, 52 to a predetermined torque value.

During adjustment of the assembly, the relative positioning between the two transducers 25, 28 may be monitored in a number of ways, i.e. optically, mechanically and electronically. The preferred method is to monitor the electrical output signals from each transducer 25, 28 generated in response to pre-formatted predetermined tracks recorded on a flexible disk.

As will now be apparent, adjustable transducer assemblies fabricated according to the teachings of the invention afford a number of significant advantages over prior art devices of this type. Firstly, due to the extreme simplicity of design, the device is relatively inexpensive to manufacture and relatively easy to assemble, without sacrificing positional accuracy, which is highly important for double sided head assemblies. Further, the relative positional adjustment between the two transducers 26, 28 is not dependent upon any additional adjustment elements, which reduces further the total cost of the assembly and requires no additional elements. Lastly, the relative simplicity of the adjustment procedure enables the entire range of positional adjustment to be obtained within one-half turn of the adjustment crank 70, which greatly facilitates the adjustment process.

While the above provides a full and complete description of the preferred embodiment of the invention, various modifications, alternate constructions and equivalents may be employed as desired. For example, while the pivot support for upper arm 12 has been illustrated as a sphere 34 and a cylinder 35, other equivalent pivoting arrangements may be used, such as a pair of spheres, a gimbal support or the like. Therefore, the above description and illustrations should not be construed as limiting the scope of the invention, which is defined by the appended claims.

What is claimed is:

1. An adjustable dual transducer assembly affording substantially linear adjustment over a predetermined range, said assembly comprising:

first and second arm members each having a transducer mounting end and another end;
   slide block means slidably mounted on said first arm member;
   means for pivotally mounting said second arm member on said slide block means;
   means for releasably locking the relative positions of said arm members and said slide block means; and
   adjustment means for providing substantially linear relative positional adjustment between said first and second arm members, said adjustment means including means on said first arm member for providing a linear guide path, means on said slide block means for contacting said guide path, a bearing slot formed in said first arm member adjacent said other end, and a bearing aperture formed in said slide block means for exposing said slot to receive an eccentric pin on a crank and for providing a bearing surface for a shank portion of said crank so that rotation of said shank provides a translational force between said first and second arm members.

2. The invention of claim 1 wherein said mounting means comprises a pivot ball received in partially spherical recesses formed at a first location in said second arm member and said slide block means, and a cylindrical roller received in mating recesses formed at a second location in said second arm member and said slide block means.

3. The invention of claim 1 wherein said linear guide path providing means comprises a pair of protruding inner wall extensions formed in said first arm member, said inner wall extensions terminating in coplanar guide surfaces, and wherein said means for contacting said guide paths comprises a first sidewall member of said slide block means.

4. The invention of claim 3 wherein said linear guide path providing means further includes an additional protruding inner wall extension formed in said first arm member and laterally disposed from said pair of inner wall extensions, said additional inner wall extension terminating in an additional guide surface, and wherein said means on said slide block means for contacting said guide path comprises the other sidewall member of said slide block means.

5. The invention of claim 1 further including means for mutually tensioning said first and second arm members.

* * * * *